F. L. SMITHSON.
Wheel Cultivator.
No. 12,653.
Patented Apr. 3, 1855.
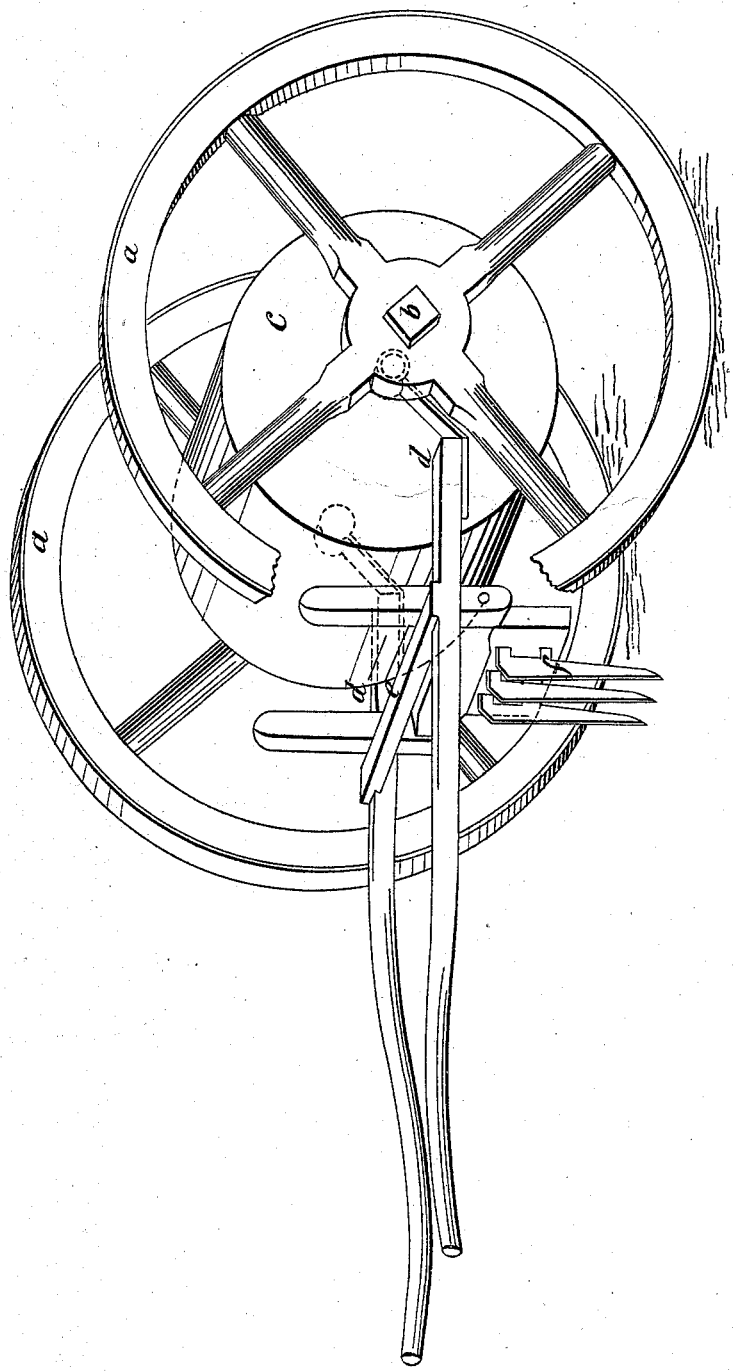

UNITED STATES PATENT OFFICE.

F. L. SMITHSON, OF MECKLENBURG COUNTY, VIRGINIA.

IMPROVEMENT IN CULTIVATORS.

Specification forming part of Letters Patent No. 12,653, dated April 3, 1855.

*To all whom it may concern:*

Be it known that I, FRANCIS L. SMITHSON, of the county of Mecklenburg and State of Virginia, have invented a certain new and useful Machine for Cultivating Tobacco, the following being a full, clear, and exact description thereof, reference being had to the accompanying drawing, in which—

Figure 1 is a general view of the machine.

My improvement or machine consists in certain devices for opening the ground and depressing the tops of the hills, as is done in hand-hoeing, but with much greater expedition and economy.

The construction is as follows: Two wheels, $a$, are firmly affixed to a square axle, $b$, upon which and between the wheels a cylinder, $c$, is affixed, having a smooth surface, as clearly appears in the drawing. Between the cylinder and the wheels there is a portion of the axle turned round, where the shafts $d$ are attached by a box in which the axle turns. These shafts $d$ are connected by a cross-bar, $e$, in the front of the cylinder, to which a frame is affixed for holding a series of narrow teeth, $f$. The implement thus constructed is drawn by a horse attached to the shafts. The teeth, as will be seen, are on a bevel-bar, so that when drawn forward they are in place; but when the horse backs they turn up, and thus pass over the ground without action.

The operation of this implement is as follows: When drawn along the tobacco-hill the teeth are designed to break and loosen the earth just previous to planting the tobacco, which is usually performed by a weeding-hoe, and the cylinder, following after, is made to press the top of the hill, as is done also by the weeding-hoe by hand labor, one horse doing by this apparatus the work of five or eight men.

Having thus fully described my improvement in cultivating tobacco, what I claim therein as new, and for which I desire to secure Letters Patent, is—

The combination of the harrow-teeth and cylinder, substantially in the manner and for the purpose set forth.

FRANCIS L. SMITHSON.

Witnesses:
JNO. G. BOYD,
JOHN E. APPLEWHITE.